(12) United States Patent
Bellino et al.

(10) Patent No.: US 9,657,899 B2
(45) Date of Patent: May 23, 2017

(54) REPLACEMENT OIL CARTRIDGE TIP AND METHOD

(71) Applicant: General Electric Company, Schenectady, NY (US)

(72) Inventors: Mark Carmine Bellino, Greenville, SC (US); Bill Damon Johnston, Jr., Easley, SC (US); Heath Ostebee, Easley, SC (US); Brian Lee Tollison, Honea Path, SC (US)

(73) Assignee: General Electric Company, Schenectady, NY (US)

( * ) Notice: Subject to any disclaimer, the term of this patent is extended or adjusted under 35 U.S.C. 154(b) by 590 days.

(21) Appl. No.: 13/975,763

(22) Filed: Aug. 26, 2013

(65) Prior Publication Data

US 2015/0053793 A1    Feb. 26, 2015

(51) Int. Cl.
```
F16N 21/00      (2006.01)
B23K 1/00       (2006.01)
B23K 26/34      (2014.01)
B23K 1/20       (2006.01)
B23K 31/02      (2006.01)
```
(52) U.S. Cl.
CPC ............ *F16N 21/00* (2013.01); *B23K 1/0008* (2013.01); *B23K 1/20* (2013.01); *B23K 26/34* (2013.01); *B23K 31/02* (2013.01); *Y10T 29/4973* (2015.01)

(58) Field of Classification Search
CPC ........... F16N 21/00; B23K 1/20; B23K 26/34; B23K 31/02; B23K 1/0008; B23K 2001/12; Y10T 29/4973; Y10T 29/49732

USPC .............. 29/402.09, 402.08, 402.11, 402.13; 239/463

See application file for complete search history.

(56) References Cited

U.S. PATENT DOCUMENTS

| | | | | |
|---|---|---|---|---|
| 2,275,177 | A * | 3/1942 | Crans ..................... | B23K 31/02 148/220 |
| 3,385,055 | A * | 5/1968 | Koblish ................... | F23R 3/14 60/748 |
| 4,111,369 | A * | 9/1978 | Sharpe ................... | F23D 11/107 239/400 |
| 5,833,141 | A * | 11/1998 | Bechtel, II ............ | F23D 17/002 239/406 |
| 6,349,536 | B1 * | 2/2002 | Fujioka .................... | F02C 3/30 60/39.55 |
| 7,000,403 | B2 * | 2/2006 | Henriquez ................ | F23R 3/16 60/737 |
| 8,347,631 | B2 * | 1/2013 | Bailey ................... | F23D 11/107 239/422 |

(Continued)

*Primary Examiner* — Essama Omgba
*Assistant Examiner* — Bayan Salone
(74) *Attorney, Agent, or Firm* — Ernest G. Cusick; Hoffman Warnick LLC (57) ABSTRACT

Various embodiments include apparatuses adapted to be used as a replacement oil cartridge tip. In some embodiments apparatuses include a replacement swirler ring for an oil cartridge tip, the replacement swirler ring having an annular main body including an inner diameter surface sized to be joined to an outer diameter surface of the oil cartridge tip by a metal joining process including one of brazing, welding temperature or mechanical interference and an outer diameter surface including channels evenly spaced about a primary axis of the annular main body, wherein the annular ring includes a material that is at least as wear-resistant as a material of the oil cartridge tip.

13 Claims, 6 Drawing Sheets

(56) References Cited

U.S. PATENT DOCUMENTS

| | | | |
|---|---|---|---|
| 2009/0223225 A1* | 9/2009 | Kraemer | F02C 7/22 60/723 |
| 2010/0223929 A1* | 9/2010 | Bailey | F23D 11/107 60/737 |
| 2012/0017595 A1* | 1/2012 | Liu | F23D 14/02 60/737 |
| 2012/0042655 A1* | 2/2012 | Lam | F23C 7/004 60/737 |

* cited by examiner

REPLACEMENT OIL CARTRIDGE TIP AND METHOD

FIELD OF THE INVENTION

The subject matter disclosed herein relates generally to oil cartridge tips. More specifically, the disclosure provided herein relates to replacement swirler rings for oil cartridge tips.

BACKGROUND OF THE INVENTION

When oil cartridge tips used in dynamoelectric machine fuel systems are worn, the entire tips are discarded. In field operation, the cartridge tip experiences premature wear in the swirler ring. Because swirler rings are integrated into the cartridge tip, replacement of the entire cartridge is required. Replacing entire oil cartridge tips is expensive. When replacing an oil cartridge tip, it is generally important that the replacement tip have the same internal and external flow patterns as the oil cartridge tip being replaced. Conventionally, swirler rings are not removed and replaced because of the difficulty in maintaining internal and external flow patterns.

BRIEF DESCRIPTION OF THE INVENTION

Various embodiments include apparatuses adapted to be used as a replacement oil cartridge tip. In some embodiments apparatuses include a replacement swirler ring for an oil cartridge tip, the replacement swirler ring having an annular main body including an inner diameter surface sized to be joined to an outer diameter surface of the oil cartridge tip by a metal joining process including one of brazing, welding temperature or mechanical interference and an outer diameter surface including channels evenly spaced about a primary axis of the annular main body, wherein the annular ring includes a material that is at least as wear-resistant as a material of the oil cartridge tip.

A first aspect provides a replacement swirler ring for an oil cartridge tip, the replacement swirler ring comprising: an annular main body including; an inner diameter surface sized to be joined to an outer diameter surface of the oil cartridge tip by a metal joining process including one of brazing, welding temperature or mechanical interference; and an outer diameter surface including channels evenly spaced about a primary axis of the annular main body, wherein the annular ring includes a material that is at least as wear-resistant as a material of the oil cartridge tip.

A second aspect provides method of replacing a worn swirler ring of an oil cartridge tip, the method comprising: removing the worn swirler ring from the oil cartridge tip by machining; and joining a replacement swirler ring to an outer diameter surface of the oil cartridge tip using a metal joining procedure that maintains an internal flow pattern of the oil cartridge tip.

A third aspect provides a method of repairing a worn swirler ring of an oil cartridge tip, the method comprising: creating a replacement swirler ring by adding material to the worn swirler ring using build-up technology, wherein the build up technology maintains an associated internal flow pattern of the oil cartridge tip and at least one braze joint of the oil cartridge tip.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not necessarily to scale. The drawings are intended to depict only typical aspects of the invention, and therefore should not be considered as limiting the scope of the invention. It is understood that elements similarly numbered between the figures may be substantially similar as described with reference to one another. Further, in embodiments shown and described with reference to FIGS. 1-10, like numbering may represent like elements. Redundant explanation of these elements has been omitted for clarity. Finally, it is understood that the components of FIGS. 1-10 and their accompanying descriptions may be applied to any embodiment described herein.

DETAILED DESCRIPTION OF THE INVENTION

The subject matter disclosed herein relates generally to oil cartridge tips. More specifically, the disclosure provided herein relates to replacement swirler rings for oil cartridge tips.

As discussed above, when oil cartridge tips used in dynamoelectric machine fuel systems are worn, the entire tips are discarded, which is expensive. When replacing an oil cartridge tip, it is generally important that the replacement tip have the same internal and external flow patterns as the oil cartridge tip being replaced. Conventionally, swirler rings are not removed and replaced because of the difficulty in maintaining internal and external flow patterns.

As differentiated from conventional oil cartridge tip maintenance, embodiments described herein help in keeping maintenance costs low by providing replacements swirler rings and methods of replacing swirler rings. The methods and apparatuses for repairing swirler rings, disclosed herein, are less expensive than replacing entire oil cartridge tips.

Figure 1:
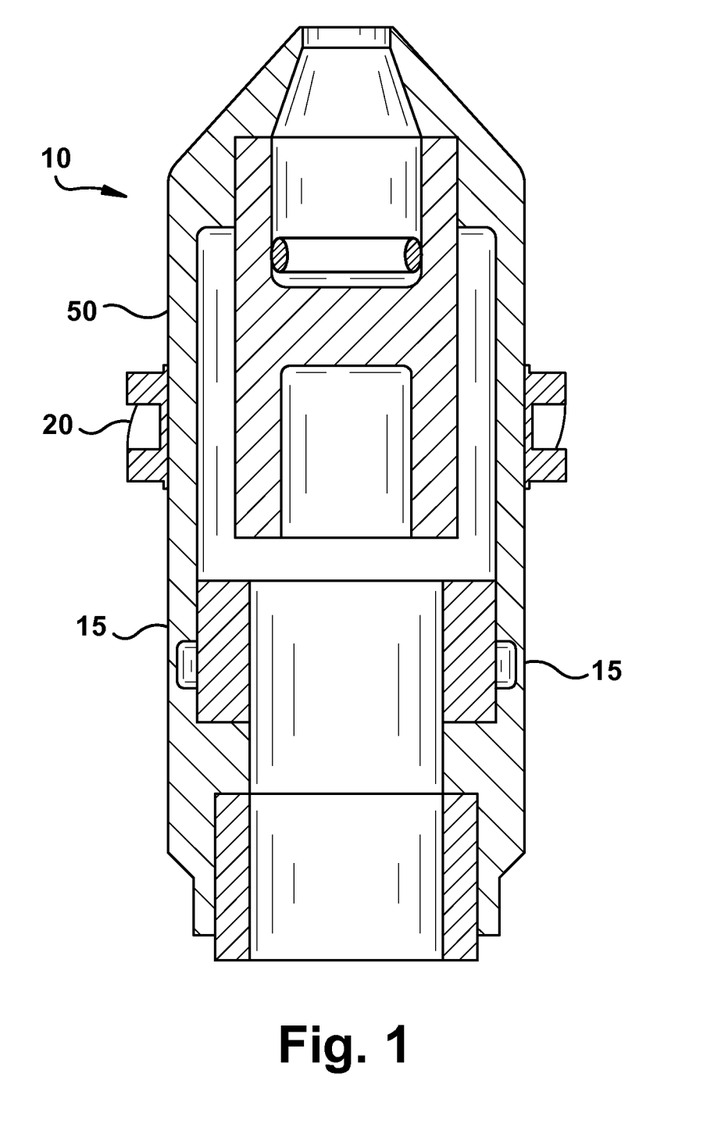
FIG. 1 illustrates a cross-sectional view of an oil cartridge tip with a swirler ring according to embodiments of the invention.

Turning to FIG. 1, a cross-sectional view of an oil cartridge tip 10 having a swirler ring 20 is shown. Two braze joints 15 are shown, however it should be understood that an oil cartridge tip 10, according to embodiments, may have any number of braze joints 15. Braze joints 15 connect oil cartridge tip 10 to the main cartridge tube.

Figure 2:
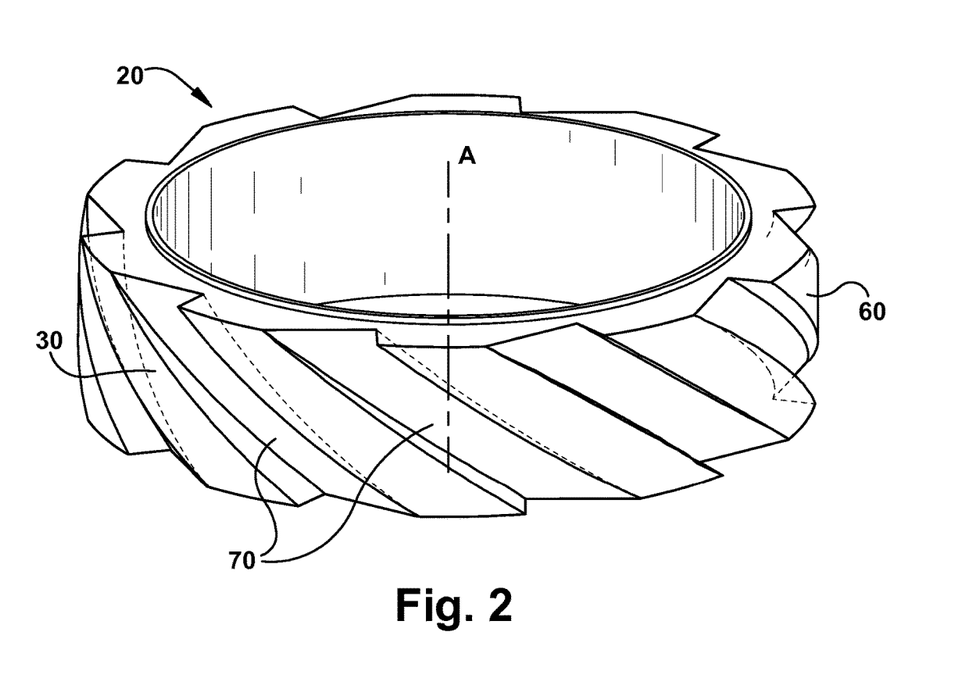
FIG. 2 illustrates a side view of a replacement swirler ring according to embodiments of the invention.

Turning to FIG. 2, a two-dimensional side view of a replacement swirler ring for an oil tip cartridge is shown. FIG. 2 illustrates a replacement swirler ring 20 for an oil cartridge tip 10 (oil cartridge tip 10 is shown in FIG. 1). The replacement swirler ring 20 includes an annular main body 30. Annular main body 30 includes an inner diameter surface 40 (shown in FIG. 4) sized to be joined to an outer diameter surface 50 of the oil cartridge tip 10 (shown in FIG. 1) by a metal joining process. The metal joining process may include one of brazing, welding or mechanical interference fitting. An interference fit is generally achieved by shaping two mating parts (i.e. the replacement swirler ring and the oil cartridge tip) so that one or the other, or both, slightly deviate in size from its/their original dimension(s). The word interference refers to the fact that one part slightly interferes with the space that the other takes up. An exemplary interference fit procedure includes where an oil cartridge may be created slightly oversize and the hole in the replacement swirler ring (through which the oil cartridge tip is going to pass) may be created slightly undersized. When the oil cartridge is pressed into the replacement swirler ring, the two parts interfere with the other's occupation of space. A result may be that both parts elastically deform slightly to fit together creating an extremely high force which results in extremely high friction between the parts. In this way, even great torque should not turn one of them relative to the other; they may be locked together and turn in unison. To achieve an interference fit, the oil cartridge tip 10 is generally cooled to the point of realizing a degree of shrinkage and the swirler ring 20 is heated for expansion. Once oil cartridge tip 10 and the swirler ring 20 are mated and cooled, the net fitment achieves an interference state.

Annular main body 30 further includes an outer diameter surface 60 which includes evenly-spaced channels 70 which may be substantially evenly spaced about a primary axis A of the annular main body 30. However, in an alternate embodiment, the evenly-spaced channels 70 may be unevenly spaced about the primary axis A. Evenly-spaced channels 70 may further be of equal size, i.e. each channel may have the same depth from their outer surfaces to their inner surfaces and may have the same width and cross sectional shape. However, channels 70 of other, various dimensions are contemplated and within the scope of the invention.

Evenly-spaced channels 70 illustrated in FIG. 2 are shown to be displaced helically relative to the primary axis A of annular main body 30. However, according to embodiments of the invention, the displacement of the evenly-spaced channels 70 may define one or more regular or irregular helix/helices. Alternatively, the evenly-spaced channels 70 may be non-helical. The Channels provide geometry to create a swirl pattern for a liquid that flows through the swirler, an example such a liquid includes water. The swirl pattern enables better mixing for a homogeneous mixture.

Annular main body 30 may include a material that is at least as wear-resistant as a material of oil cartridge tip 10. For example, annular main body 30 may include a high-temperature alloy including, but not limited to a cobalt-based alloy such as any of Haynes 25, Haynes 6B, Haynes 188, NS-163 or Ultimet. The material of annular main body 30 may further include a combination of these and/or other alloys. Other materials contemplated for annular main body 30 may include cobalt-chromium-based alloys.

Figure 3:
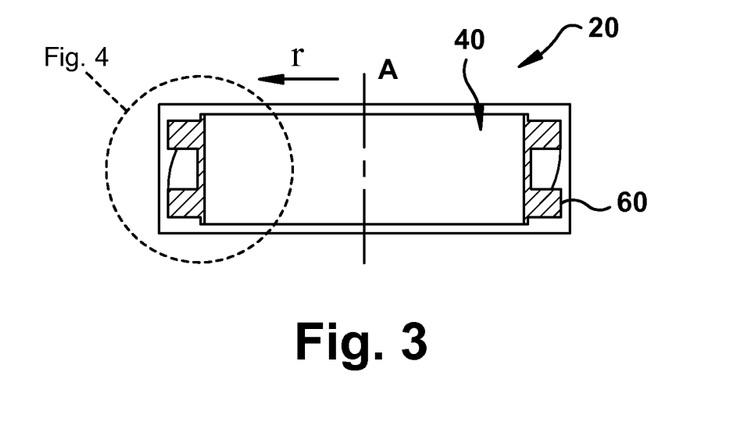
FIG. 3 illustrates a cross-sectional view of a replacement swirler ring according to embodiments of the invention.

Turning to FIG. 3, a cross-sectional view of a replacement swirler ring 20 is illustrated. FIG. 3 illustrates first and second axially-facing surfaces 80, 90 of annular main body 30. The terms first and second are used merely to differentiate between the surfaces, either axially-facing surface 80, 90 may be referred to as the first or the second axially-facing surface. A channel 70 and outer diameter surface 60 of annular main body 30 are also illustrated for reference.

Figure 4:
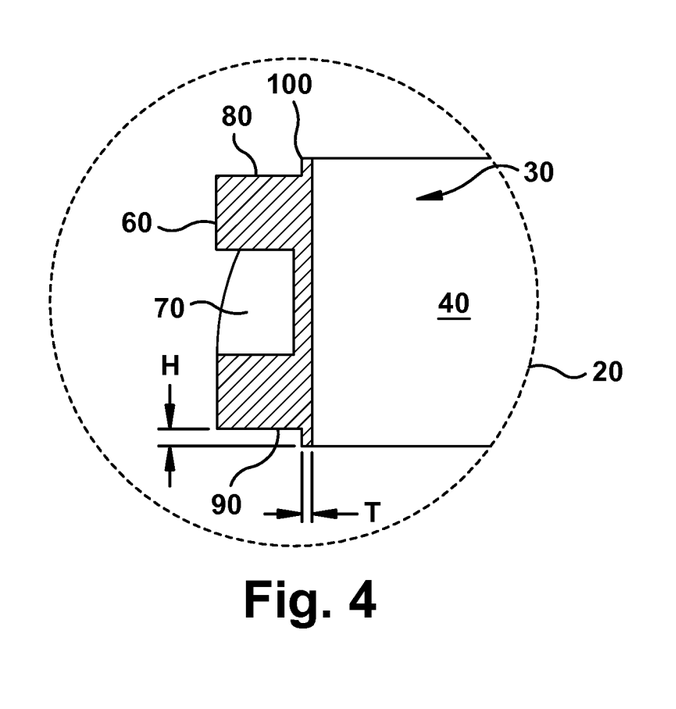
FIG. 4 illustrates a detail of a cross-section of a replacement swirler ring according to embodiments of the invention.

FIG. 4 illustrates a consumable feature 100 coupled to each of the first and second axially facing surfaces 80, 90, however it is contemplated that embodiments may include only one such consumable feature 100, or none at all. In cases where at least one consumable feature 100 is utilized, the at least one consumable feature 100 may be adapted to be consumed in response to replacement swirler ring 20 being joined to oil cartridge tip 10 by a metal joining process. Consumable feature 100 is intended to be liquefied during the metal fusion process thus filling any voids encountered during fusion metal joining process. The metal joining process may be referred to as fusion process. The consumable feature 100 is generally not intended to be utilized as intended for the mechanical interference method although consumable feature 100 does not necessarily interfere with an interference attachment method, so consumable feature may be used along with mechanical interference. One geometry would work for both the fusion and interference methods. Also, consumable feature 100 is intended to eliminate or reduce a need for a filler material to be used during the metal joining process, such as a welding process Consumable feature 100 may have a thickness T of approximately 0.120-0.130 millimeters and a height H of approximately twice the thickness T. Thickness T is measured in a radial direction r, away from the primary axis A, and height H is measured in a direction orthogonal to thickness T, as shown in FIG. 4. Thickness T may approach but not exceed the wall thickness of main body 30. The dimensions described are merely exemplary and it is contemplated that the thickness T and height H of consumable feature 100 may be greater than or less than the stated dimension without deviating from the inventive concepts.

Figure 5:
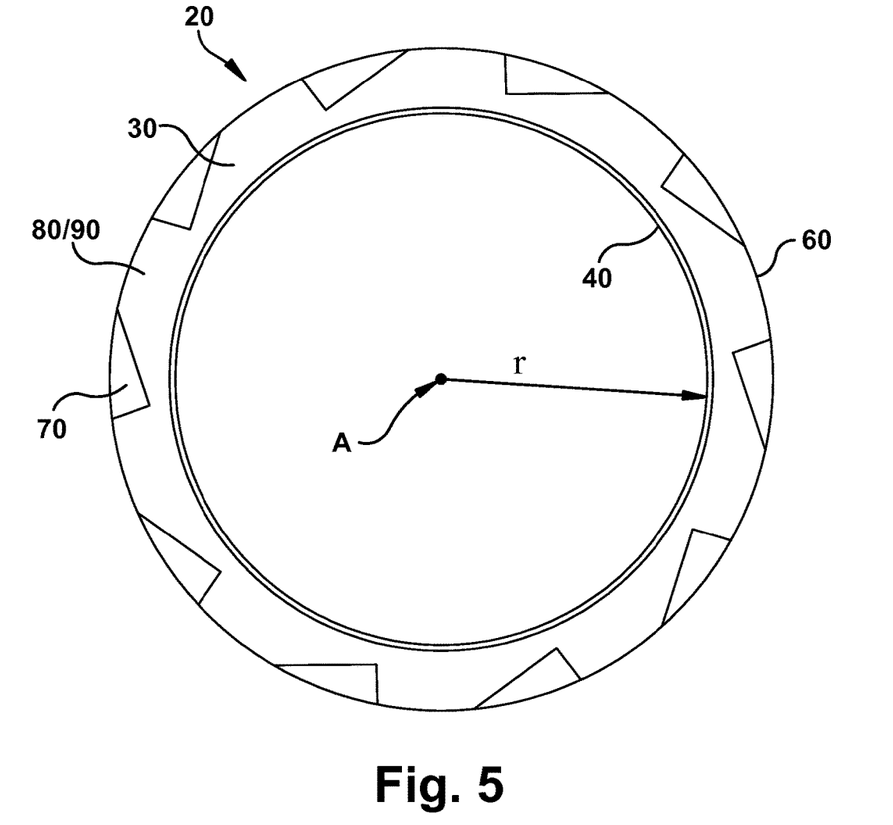
FIG. 5 illustrates a plan view of a replacement swirler ring according to embodiments of the invention.

Turning to FIG. 5, a plan view of a replacement swirler ring 20 is illustrated. FIG. 5 illustrates one of first and second axially-facing surfaces 80, 90 of annular main body 30. Axis A and radial direction r, away from axis A, are illustrated. A partial view of channel 70 is illustrated, along with annular main body inner and outer diameter surfaces 40 and 60, respectively. While this plan view illustrates ten channels 70, the number of channels is not limited to ten and a replacement swirler ring 20 may have more or fewer than ten channels 70. Furthermore, the number of channels 70 of a replacement swirler ring 20 may be the same as or different from the number of channels of the swirler ring being replaced.

Figure 6:
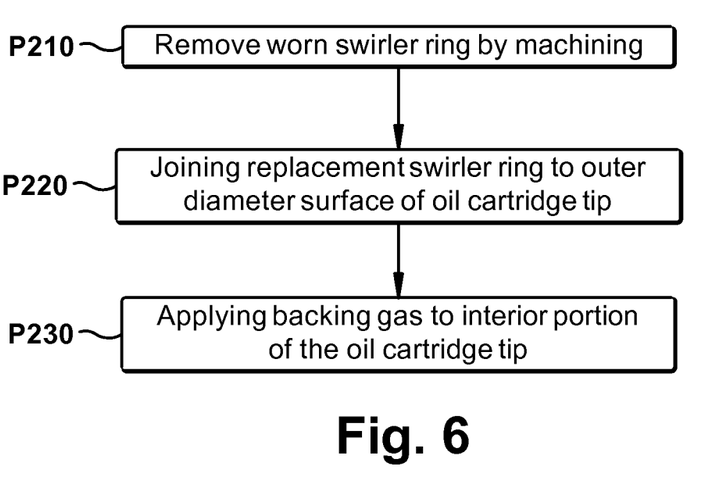
FIG. 6 illustrates processes in a method according to embodiments of the invention.

FIG. 6 illustrates a flow chart showing processes in a method of replacing a worn swirler ring of an oil cartridge tip 10. Process P210 includes removing the worn swirler ring from oil cartridge tip 10 by machining. Machining may be performed by any appropriate process now known or later developed. Current process includes manual lathe operation. Such a process may include grinding, or manual or computer numerical controlled (CNC) lathe machining.

Process P220 includes joining a replacement swirler ring 20 to an outer diameter surface of the oil cartridge tip using a metal joining procedure that maintains an internal flow pattern of the oil cartridge tip 10. More particularly, oil cartridge tip 10 includes internal features that define its internal flow pattern. It should be understood that the internal flow pattern is a structural feature of oil cartridge tip 10. The temperature of the joining procedure and therefore the altered temperature of oil cartridge tip 10 may be controlled to avoid alteration of the internal flow pattern. Likewise, these processes may also be performed to avoid alteration of the external flow pattern of the oil cartridge tip 10.

Replacement swirler ring 20, joined in process P220, may include a consumable feature 100 that is adapted to be consumed during the joining. The consumable feature 100 is discussed above with respect to FIG. 3. In addition, or alternatively, replacement swirler ring 20, joined in process P220, may include material that is more wear-resistant than the material of the worn swirler ring. Such replacement swirler ring material may include a cobalt-based alloy or any of the materials discussed above with respect to FIG. 2.

Process P220 may include a joining process including welding, brazing or mechanical interference fitting. As discussed above, the thermal and mechanical aspects of the specific metal joining process selected should maintain, and therefore not alter, the internal flow pattern of oil cartridge tip 10. Furthermore, the metal joining process may be performed such that an external flow pattern of oil cartridge tip 10 is maintained and not altered.

According to aspects of the invention, replacement swirler ring 20 joined in process P220 may have geometric dimensions different from the geometric dimensions of the worn swirler ring. Such geometric dimensions may include, and are not limited to swirler ring width and height, along with dimensions of their channels 70 or other physical aspects. Alternatively, some of the geometric dimensions of the worn swirler ring may be the same as the geometric dimensions of the replacement swirler ring 20, while other geometric dimensions may be different.

The oil cartridge tip 10 may have one or more braze joints 15 (shown in FIG. 1) that should not be altered by the joining process temperature or any other aspect of the joining process. Process P220 may include joining performed at a temperature below a melt temperature of the at least one braze joint 15 to maintain the at least one braze joint 15.

FIG. 6 further illustrates an optional process that may be performed in conjunction with this method. Optional process P230 includes applying a backing gas to an interior portion of oil cartridge tip 10 to maintain a temperature of oil cartridge tip 10 below a threshold. The threshold temperature should be below a temperature that risks distortion of the cartridge tip 10 or its parts or risks melting of braze joints 15. The application of the backing gas may take place before and/or during the joining process P220. The backing gas may include argon or other gasses appropriate for maintaining the temperature of oil cartridge tip 10. Application of the backing gas may be performed by any appropriate process now known, or later developed.

Figure 7:
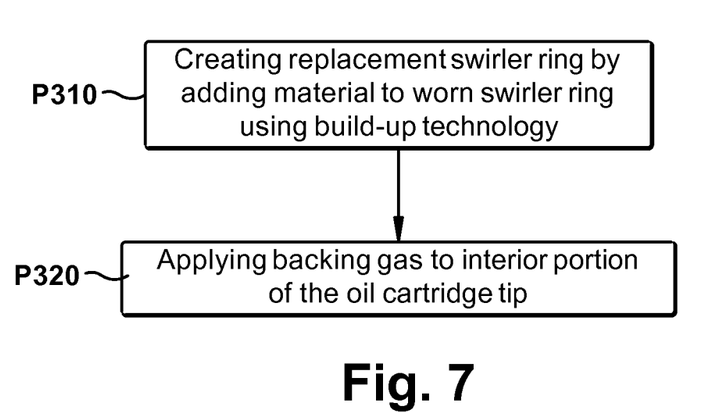
FIG. 7 illustrates processes in a method according to embodiments of the invention.

Turning to FIG. 7, a flow chart showing processes in a method of repairing a worn swirler ring of an oil cartridge tip 10 is illustrated. This method includes process P310 which includes creating a replacement swirler ring 20 by adding material to a worn swirler ring using build-up technology. (See also FIGS. 8-10.) The build up technology used in process P310 may maintain the associated internal flow pattern of oil cartridge tip 10. Furthermore, the build up technology used in process P310 maintains and therefore does not alter at least one braze joint 15 of oil cartridge tip 10.

The material added in process P310 may be more wear-resistant than the material of the worn swirler ring and may include a cobalt-based or other alloy, as discussed above with respect to FIG. 2.

The build-up technology used in process P310 may include one of laser cladding or laser metal deposition. The build up technology used in process P310 may use (or be performed at) a temperature below a melt temperature of the at least one braze joint 15 and the build-up technology used in process P310 maintains an associated external flow pattern of the oil cartridge tip 10. The build-up technology may further not alter and therefore maintain an associated internal flow pattern of the oil cartridge tip.

The replacement swirler ring built by the build up technology used in process P310 may have a set of geometric dimensions different than a set of geometric dimensions of the worn swirler ring. Exemplary differences and similarities in geometries are discussed above with respect to this method.

FIG. 7 further illustrates optional process P320 which includes applying a backing gas to an interior portion of the oil cartridge tip 10 to maintain a temperature of the oil cartridge tip 10 below a threshold. The threshold temperature should be below a temperature that risks distortion of the cartridge tip 10 or its parts or risks melting of braze joints 15. As discussed above, the backing gas may include argon and/or another appropriate gas and the application of the backing gas may take place before and/or during the joining process.

Figure 8:
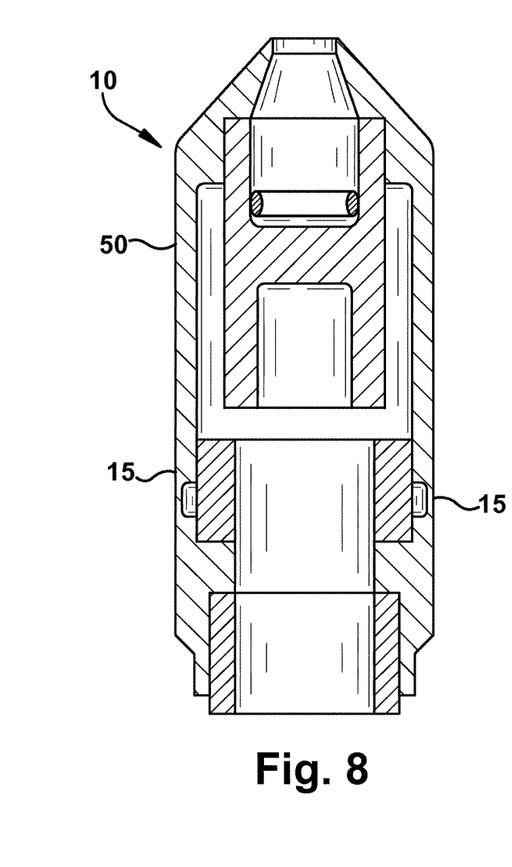
FIG. 8 illustrates a cross-sectional view of an oil cartridge tip during repair of a swirler ring according to embodiments of the invention.
Figure 9:
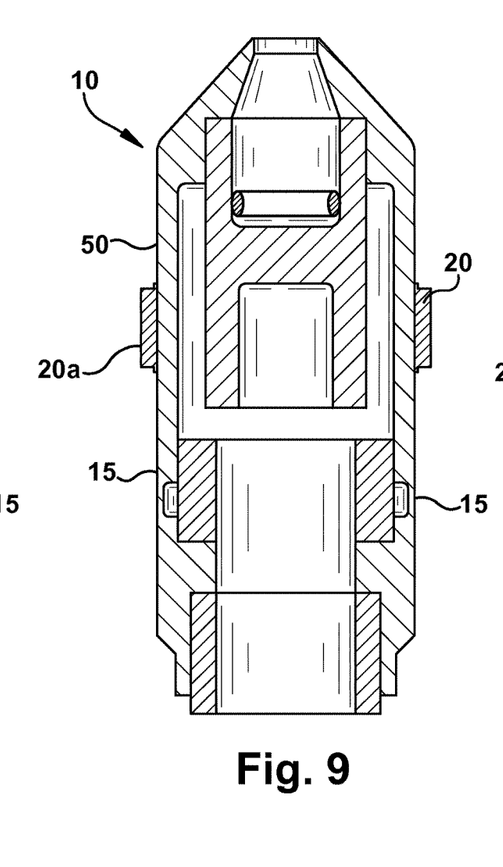
FIG. 9 illustrates a cross-sectional view of an oil cartridge tip during repair of a swirler ring according to embodiments of the invention.
Figure 10:
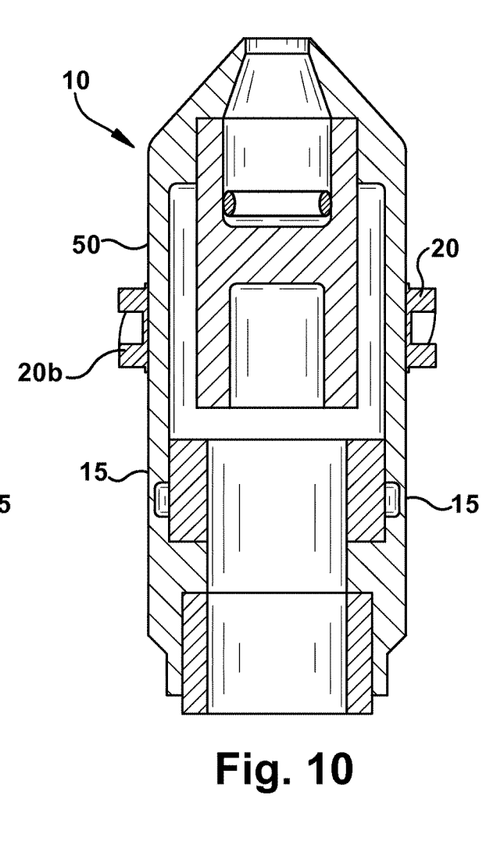
FIG. 10 illustrates a cross-sectional view of an oil cartridge tip after repair of a swirler ring according to embodiments of the invention.

FIGS. 8-10 illustrate oil cartridge tip 10 in three phases of the method discussed above with reference to FIG. 6. FIG. 8 illustrates oil cartridge tip 10 with a worn swirler ring, prior to the addition of material in a build up procedure. FIG. 9 illustrates oil cartridge tip 10 with a swirler ring, in an intermediate stage of addition of material in a build up procedure. Last, FIG. 10 illustrates oil cartridge tip 10 with a repaired swirler ring, after the addition of material in a build up procedure. It should be noted that the worn swirler ring 20*a* and 20 are not necessarily drawn to scale. FIGS. 8-10 are intended to illustrate exemplary stages of a build up process according to embodiments.

It should be noted that the methods and apparatuses described herein may be used for repair and maintenance of oil cartridge tips used in conjunction with steam turbine technologies. It should further be noted that the methods and apparatuses described herein may also be used for repair and maintenance of fuel injectors used in reciprocating engines.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the terms "axial" and/or "axially" refer to the relative position/direction of objects along axis A, which is substantially parallel with the long axis of a conduit at a pipe crossing. As further used herein, the terms "radial" and/or "radially" refer to the relative position/direction of objects along radius (r), which is substantially perpendicular with axis A and intersects axis A at only one location. Additionally, the terms "circumferential" and/or "circumferentially" refer to the relative position/direction of objects along a circumference which surrounds axis A but does not intersect the axis A at any location.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A replacement swirler ring for an oil cartridge tip, the replacement swirler ring comprising:
   an annular main body including;
      an inner diameter surface sized to be joined to an outer diameter surface of the oil cartridge tip by a metal joining process including one of brazing, welding or mechanical interference,
      wherein the inner diameter surface is sized to be joined to the outer diameter surface of the oil cartridge tip such that an entirety of the inner diameter surface contacts the outer diameter surface of the oil cartridge tip; and
      an outer diameter surface including channels evenly spaced about a primary axis of the annular main body, wherein the annular main body includes a material that is at least as wear-resistant as a material of the oil cartridge tip,
      wherein the annular main body includes at least one of a first or a second axially-facing surface, and the at least one of a first or a second axially-facing surface includes an inner diameter surface coincident with the inner diameter surface of the annular main body, the replacement swirler ring further including:
         at least one consumable feature coupled to the at least one of a first or a second axially-facing surface of the annular main body prior to being joined to the oil cartridge tip, the at least one consumable feature adapted to be consumed in response to the replacement swirler ring being joined to the oil cartridge tip by the metal joining process, wherein the metal joining process includes one of brazing or welding.

2. The replacement swirler ring of claim 1, wherein the material of the annular main body includes a cobalt-based alloy.

3. The replacement swirler ring of claim 1, wherein the at least one consumable feature has a thickness of approximately 0.120-0.130 millimeters and a height of approximately twice the thickness.

4. The replacement swirler ring of claim 1, wherein the evenly-spaced channels are substantially equally-sized and helical around the primary axis of the annular main body.

5. A method of replacing a worn swirler ring of an oil cartridge tip, the method comprising:
   removing the worn swirler ring from the oil cartridge tip by machining; and
   joining an entire inner diameter of a replacement swirler ring to an outer diameter surface of the oil cartridge tip using a metal joining procedure that maintains an internal flow pattern of the oil cartridge tip,
   wherein prior to being joined to the oil cartridge tip, the replacement swirler ring includes a consumable feature adapted to be consumed during the joining.

6. The method of claim 5, further comprising:
   applying a backing gas to an interior portion of the oil cartridge tip to maintain a temperature of the oil cartridge tip below a threshold.

7. The method of claim 5, wherein the replacement swirler ring material is more wear-resistant than the material of the worn swirler ring.

8. The method of claim 7, wherein the replacement swirler ring material includes a cobalt-based alloy.

9. The method of claim 5, wherein the oil cartridge tip includes at least one braze joint, and wherein the joining is performed at a temperature below a melt temperature of the at least one braze joint to maintain the at least one braze joint.

10. The method of claim 5, wherein the metal joining procedure maintains an external flow pattern of the oil cartridge tip.

11. The method of claim 5, wherein the worn swirler ring has a set of geometric dimensions different than a set of geometric dimensions of the replacement swirler ring.

12. The method of claim 5, wherein the metal joining procedure includes one of welding, brazing or mechanical interference fitting.

13. A replacement swirler ring for an oil cartridge tip, the replacement swirler ring comprising:
   an annular main body including;
      an inner diameter surface sized to be joined to an outer diameter surface of the oil cartridge tip by a metal joining process including one of brazing, welding or mechanical interference; and
      an outer diameter surface including channels evenly spaced about a primary axis of the annular main body, wherein the annular main body includes a material that is at least as wear-resistant as a material of the oil cartridge tip,
      wherein the annular main body includes at least one of a first or a second axially-facing surface and the at least one of a first or a second axially-facing surface includes an inner diameter surface coincident with the inner diameter surface of the annular main body, the replacement swirler ring further including:
         at least one consumable feature coupled to the at least one of a first or a second axially-facing surface of the annular main body, the at least one consumable feature adapted to be consumed in response to the replacement swirler ring being joined to the oil cartridge tip by the metal joining process, wherein the metal joining process includes on of brazing or welding,
      wherein the at least one consumable feature has a thickness of approximately 0.120-0.130 millimeters and a height of approximately twice the thickness.

* * * * *